March 6, 1962  G. W. ELDER  3,023,612
HYDRAULIC SEISMOMETER
Filed Oct. 6, 1960  2 Sheets-Sheet 1

INVENTOR.
GEORGE W. ELDER
BY
Knox & Knox

March 6, 1962  G. W. ELDER  3,023,612
HYDRAULIC SEISMOMETER

Filed Oct. 6, 1960  2 Sheets-Sheet 2

INVENTOR.
GEORGE W. ELDER
BY
Knox & Knox

3,023,612
HYDRAULIC SEISMOMETER
George W. Elder, 925 Rosecrans, San Diego, Calif.
Filed Oct. 6, 1960, Ser. No. 60,817
7 Claims. (Cl. 73—71.2)

The present invention relates generally to vibration sensing means and more particularly to a hydraulic seismometer.

The primary object of this invention is to provide a seismometer utilizing a vibration sensing inertial mass suspended in a fluid system to impart vibratory motion to the fluid, which is converted to a signal suitable for actuating a conventional seismic indicator or recorder, the inertial mass being free of periodicity and giving continuous accurate readings.

Another object of this invention is to provide a seismometer in which the signal representing the vibration is obtained from translating means having no direct mechanical connection with the vibration sensing system, thereby eliminating a primary source of friction and drag which might affect accuracy.

Another object of this invention is to provide a seismometer in which the vibration sensing system has a high degree of inherent damping, so preventing oscillations and misleading indications.

A further object of this invention is to provide a seismometer which is mounted on a simple supporting frame and contains no complex systems of levers or linkages, such as used in other mechanisms of the general type.

Finally, it is an object to provide a hydraulic seismometer of the aforementioned character which is simple and convenient to construct and use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawings.

Figure 1:
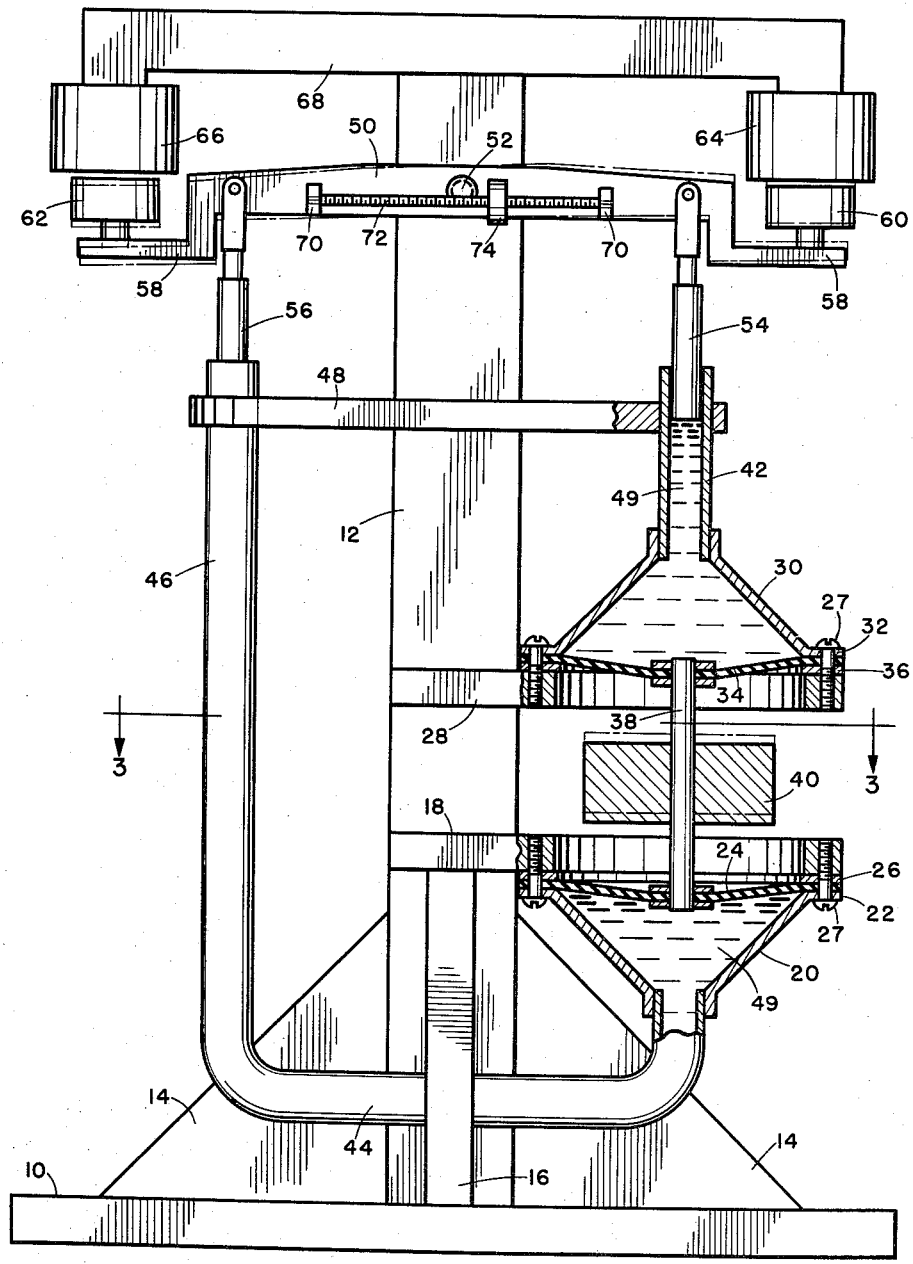
FIGURE 1 is a front elevation view of the seismometer, portions being sectioned to reveal the vibration sensing means.
Figure 2:
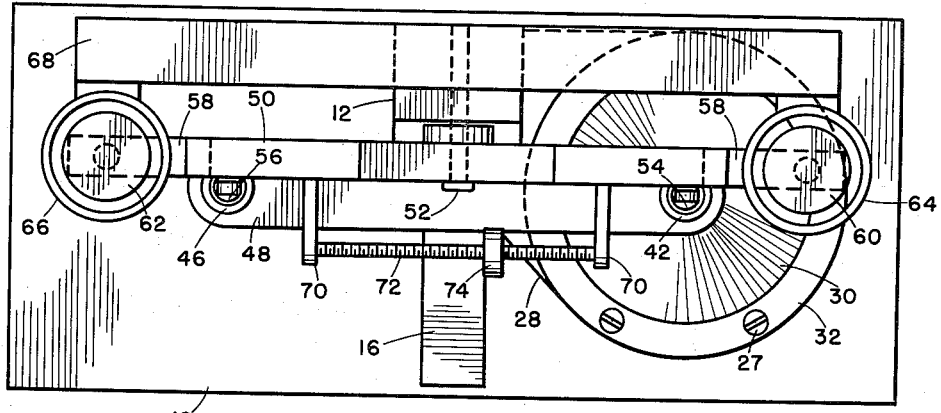
FIGURE 2 is a top plan view of the apparatus.
Figure 3:
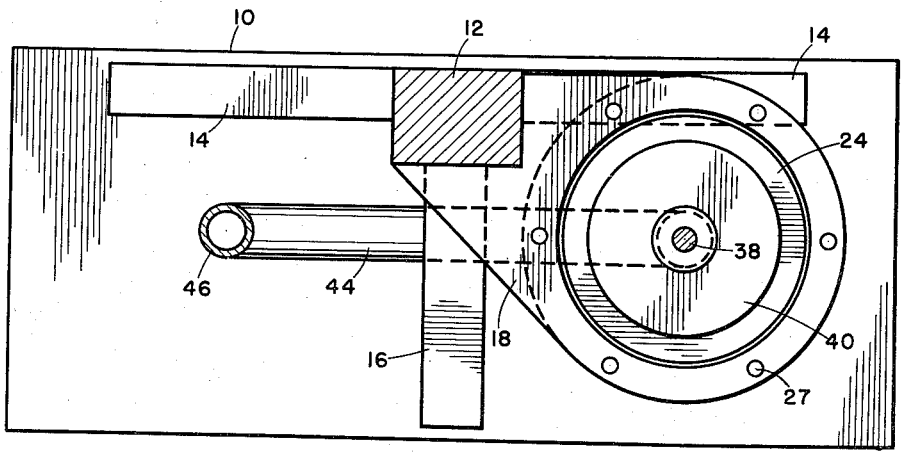
FIGURE 3 is a sectional view taken on the line 3—3 of FIGURE 1.
Figure 4:
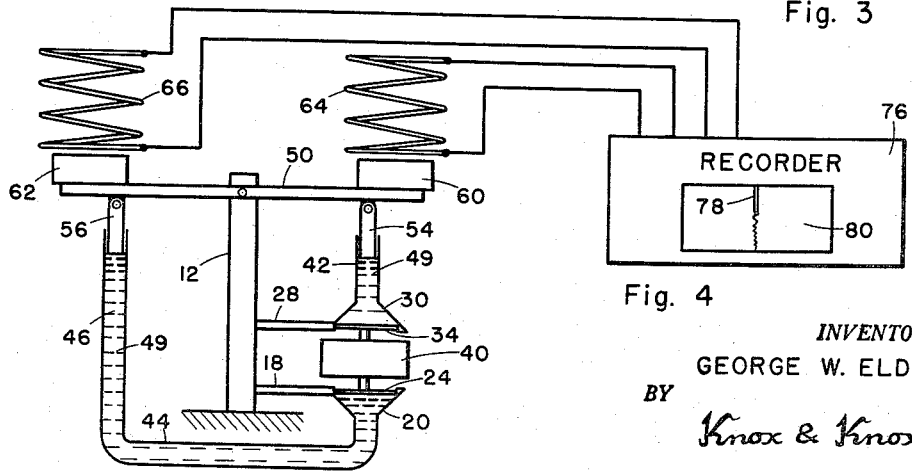
FIGURE 4 is a diagrammatic representation of the apparatus coupled to a recorder or indicator.

The apparatus is mounted on a base 10 having an upright post 12 rigidly supported by gussets 14 and 16. The structure is merely an example of a suitable arrangement and may be varied considerably to suit a particular installation, the primary considerations being rigidity and means for securing the instrument to a suitable supporting surface.

Adjacent the lower end of the post 12 is a laterally extending bracket 18, below which is secured a substantially conical reservoir 20 having its apex downwardly, the large end of said reservoir having an annular flange 22. The reservoir 20 is enclosed by a resilient diaphragm 24 attached to the flange 22 and held by a retaining ring 26, the assembly being secured by suitable screws 27 which also hold the reservoir to the bracket 18.

Spaced above the bracket 18 is a similar bracket 28 on which is mounted a second conical reservoir 30, having its apex disposed upwardly and being in vertical axial alignment with the reservoir 20. The reservoir 30 has a flange 32 and is closed by a resilient diaphragm 34, held by a retaining ring 36, the assembly being attached by further screws 27 to the bracket 28. Between the diaphragms 24 and 34 is a vertical support rod 38 on which is fixed a sensing mass 40, the ends of said support rod being attached and sealed to the centers of the diaphragms.

Extending upwardly from the apex of reservoir 30 is a standpipe 42, while extending from the apex of reservoir 20 is a generally U-shaped pipe 44 leading to a second upright standpipe 46, parallel to and laterally spaced from the standpipe 42. The upper ends of both standpipes 42 and 46 are horizontally aligned and are supported from the post 12 by a cross bar 48.

The reservoirs 20 and 30 and the standpipes 42 and 46 are filled with a suitable fluid 49, such as oil, water, or the like, to a common level slightly below the upper ends of the standpipes, the levels being equalized with allowance for the slight sag of diaphragms 24 and 34 due to the weight of sensing mass 40. Above the standpipes is a rocker arm 50, pivotally mounted on a central hinge pin 52 to the post 12. Pivotally connected adjacent the ends of the rocker arm 50 are pistons 54 and 56 which are slidable in the standpipes 42 and 46, respectively, and rest on the surfaces of the fluid therein. The ends of rocker arm 50 have downwardly stepped portions 58 on which are mounted permanent magnets 60 and 62, the downwardly stepped arrangement placing the magnets radially opposite each other on the horizontal axis of the rocker arm, so reducing horizontal displacement while swinging in the arc of motion of the ends of the rocker arm.

Immediately above the magnets 60 and 62, in vertical axial alignment therewith, are open core pick-up coils 64 and 66, fixed to the ends of a transverse support bar 68 on the post 12, said coils being positioned so that the magnets are spaced just below the lower ends of the coils when the rocker arm 50 is horizontal.

To provide for centering or zero adjustment of the instrument, the rocker arm 50 has a pair of laterally spaced lugs 70, between which is fixed a threaded rod 72 carrying a manually adjustable balance weight 74. Lateral adjustment of the balance weight 74 on either side of the hinge pin 52 will level the rocker arm 50 and allow for slight variations in fluid level.

In use, the instrument is securely mounted on a solid base, such as a concrete slab in the ground, whereby any vertical vibrations or motion cause vertical movements of the sensing mass 40 relative to the support. The motion of the sensing mass 40 is transmitted through diaphragms 24 and 34 to the fluid 49, causing vertical displacement of pistons 54 and 56 and tilting the rocker arm 50, as indicated in broken line in FIGURE 1. This action moves the magnets 60 and 62 into and away from the ends of coils 64 and 66, respectively, causing electrical currents to be induced in the coils. It will be obvious that the induced currents are proportional in magnitude to the intensity of vibrations being sensed, since the displacement of the magnets is directly governed by motion of the sensing mass 40. Also, the polarity of the induced currents will be dependent on the direction of displacement of the sensing mass above or below its neutral or static position.

By connecting the coils 64 and 66 to a conventional type of recorder 76, the electrical signals are translated as motions of a stylus 78 on a moving strip of paper or a seismogram, indicated at 80. The specific construction of such a recorder and its operation are well known and need not be described in detail in this disclosure. If necessary, amplification means may be used to boost the electrical signals in order to operate the recorder properly.

Since the diaphragms 24 and 34 are large in area in relation to the cross sectional area of standpipes 42 and 46, the motions of the diaphragms caused by oscillation of the sensing mass 40 will be amplified in terms of surface level fluctuations of the fluid. The hydraulic system is thus very sensitive and provides ample output reaction for accurate indication.

The fluid system and the diaphragms between which the sensing mass is suspended provide a high degree of damping and prevent continued oscillation of the mass after actual vibration has ceased. In addition, the self-inductance of the pick-up coils 64 and 66 has a damping effect. Thus the instrument is non-periodic, as opposed to pendulum type seismometers which require a settling period after each disturbance and often maintain inherent motion between closely spaced vibrations. The hydraulically suspended, inertial type sensing means reproduces intermittent or sustained seismic vibrations accurately and continuously.

While the instrument is illustrated as being capable of measuring vertical vibrations, it will be evident that the lower portion of the fluid system, including the reservoirs and sensing mass, may be rotated to bring the axis of motion of the sensing mass horizontal. In this manner, lateral vibrations can be detected and, by using three such instruments effective on orthogonal axes, a three dimensional representation of seismic disturbances can be obtained.

The arrangement of magnets and coils is merely one means of obtaining a suitable output signal without requiring mechanical connection to the moving parts of the instruments. Other such means will be apparent to those skilled in the art, a further example being the use of a mirror mounted on the rocker arm to reflect a beam of light to photoelectric cells, the light beam being caused to swing by motion of the rocker arm and so vary the energization of the photoelectric cells.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. Vibration sensing means, comprising: a rigid support having means for fixation to the body the vibration of which is to be sensed, whereby said vibration is communicated to the support; a pair of fluid reservoirs fixed in relation to said support; each of said reservoirs having a resilient diaphragm closing one end thereof; said diaphragms being in confronting relation; an inertial mass having a rigid connection to and suspended by and between said diaphragms; a pipe extending from the other end of each of said reservoirs; a fluid substantially filling said reservoirs and said pipes to levels adjacent the end of each pipe; a piston slidably mounted in each of said pipes and supported by said fluid; translating means coupled to said pistons to detect motions thereof caused by fluctuations in fluid level due to vibration of said inertial mass; said translating means providing an output signal proportional to the sensed vibration; and indicating means operatively connected to said translating means.

2. Vibration sensing means, comprising: a rigid support capable of being securely affixed to a solid footing firmly imbedded in the earth; a pair of fluid reservoirs fixedly positioned in relation to said support; each of said reservoirs having a resilient diaphragm closing one end thereof; said diaphragms being in confronting relation; an inertial mass connected to and suspended between said diaphragms by means of a rigid bar firmly attached to said diaphragms; a pipe extending from the other end of each of said reservoirs and supported by said rigid support; a fluid substantially filling said reservoirs and said pipes to levels adjacent the end of each pipe; a piston slidably mounted in each of said pipes and supported by said fluid; a rocker arm pivotally mounted on said support; said pistons being connected to said rocker arm on opposite sides of the pivot; translating means coupled to said rocker arm to detect motions thereof caused by fluctuations in fluid level due to vibration of said inertial mass; said translating means providing an output signal proportional to the sensed vibration; and indicating means operatively connected to said translating means.

3. Vibration sensing means according to claim 2, wherein said translating means includes permanent magnets fixed on opposite ends of said rocker arms; and coils mounted adjacent to and in alignment with said magnets to provide induced electrical output signals proportional to the motion of the magnets into and away from the coils.

4. Vibration sensing means according to claim 2 and including a balance weight mounted on said rocker arm and longitudinally adjustable thereon for static balancing.

5. Vibration sensing means, comprising: a rigid support having means for fixation to the body the vibration of which is to be sensed, whereby said vibration is communicated to the support; a pair of fluid reservoirs fixed to said support; said reservoirs being tapered and having their larger ends adjacent and confronting each other; resilient diaphragms fixed to and enclosing the confronting ends of said reservoirs; an inertial mass having a rigid connection to and suspended by and between said diaphragms; a pipe extending from the other end of each of said reservoirs; a fluid substantially filling said reservoirs and said pipes to levels adjacent the end of each pipe; a piston slidably mounted in each of said pipes and supported by said fluid; a rocker arm pivotally mounted on said support; said pistons being connected to said rocker arm on opposite sides of the pivot; translating means coupled to said rocker arm to detect motions thereof caused by fluctuations in fluid level due to vibration of said inertial mass; said translating means providing an output signal proportional to the sensed vibration; and indicating means operatively connected to said translating means.

6. Vibration sensing means, comprising: a rigid support having means for fixation to the body the vibration of which is to be sensed, whereby said vibration is communicated to the support; a pair of fluid reservoirs fixedly positioned on said rigid support; said reservoirs being tapered and having their larger ends adjacent and confronting each other; resilient diaphragms fixed to and enclosing the confronting ends of said reservoirs; a support rod connected to and suspended between said diaphragms at the centers thereof; an inertial mass mounted on said support rod, whereby vibration applied to said rigid support produces relative movement between said support and said inertial mass; an upright standpipe extending from the other end of each of said reservoirs and fixedly supported by said support; a fluid substantially filling said reservoirs and said standpipes to a common level adjacent the upper ends of the standpipes; pistons slidably mounted in the upper ends of said standpipes and supported by said fluid; a rocker arm pivotally mounted on said support; said pistons being connected to said rocker arm on opposite sides of the pivot; said rocker arm having downwardly stepped end portions; permanent magnets mounted on said end portions; open core coils suspended above and in alignment with said magnets to provide induced electrical output signals proportional to the motion of the magnets due to vibrations sensed by said inertial mass and applied, through said fluid, to said rocker arm; and indicator means connected to said coils to provide indication of sensed vibrations.

7. Vibration sensing means, comprising: a rigid support having means for fixation to the body the vibration of which is to be sensed, whereby said vibration is communicated to the support; a pair of fluid reservoirs fixed in relation to said support; each of said reservoirs having a resilient diaphragm closing one end thereof; said diaphragms being in confronting relation; an inertial mass having a rigid connection to and suspended by and between said diaphragms; said reservoirs having a source of fluid connected to each so that movement of said inertial mass relative to said reservoirs causes some of said fluid to flow out of one reservoir and an equal quantity of said fluid to flow into the other reservoir; sensing means operated by said fluid as a result of said movement of the fluid; and means providing a recognizable signal proportional to the sensed movement.

References Cited in the file of this patent

UNITED STATES PATENTS 2,390,187    Sharpe _____ Dec. 4, 1945
2,702,883    Petroff et al. _____ Feb. 22, 1955